(12) United States Patent     (10) Patent No.:   US 12,578,919 B2

Forth et al.          (45) Date of Patent:     Mar. 17, 2026

(54) DYNAMIC MAPPING OF AUDIO TO ZONES

(71) Applicant: JUKE AUDIO INC., Manhattan Beach, CA (US)

(72) Inventors: John Bradford Forth, Rio Grande, PR (US); Yulong Gu, Los Angeles, CA (US); Bradford Colton Forth, Manhattan Beach, CA (US)

(73) Assignee: JUKE AUDIO INC., Manhattan Beach, CA (US)

( * ) Notice: Subject to any disclaimer, the term of this patent is extended or adjusted under 35 U.S.C. 154(b) by 240 days.

(21) Appl. No.: 18/375,937

(22) Filed: Oct. 2, 2023

(65)         Prior Publication Data

US 2024/0111480 A1     Apr. 4, 2024

Related U.S. Application Data

(60) Provisional application No. 63/412,414, filed on Oct. 1, 2022.

(51) Int. Cl.
    G06F 3/16        (2006.01)
(52) U.S. Cl.
    CPC ................................... G06F 3/165 (2013.01)
(58) Field of Classification Search
    CPC ....................................................... G06F 3/165
    See application file for complete search history.

(56)         References Cited

U.S. PATENT DOCUMENTS

| | | | |
|---|---|---|---|
| 10,853,023 B2 † | 12/2020 | Millington | |
| 11,825,152 B2 † | 11/2023 | Vega-Zayas | |
| 2004/0117044 A1 * | 6/2004 | Konetski | ................. H04S 3/008 |
| | | | 700/94 |
| 2004/0175002 A1 * | 9/2004 | Christensen | ......... H04R 29/007 |
| | | | 381/59 |
| 2016/0094678 A1 | 3/2016 | Kumar et al. | |

(Continued)

FOREIGN PATENT DOCUMENTS

| | | | |
|---|---|---|---|
| EP | 2864953 B1 † | 4/2015 | |

OTHER PUBLICATIONS

International Search Report and Written Opinion issued in corresponding application No. PCT/US2023/034323, dated Jan. 4, 2024.

*Primary Examiner* — Joseph Saunders, Jr.

(74) *Attorney, Agent, or Firm* — Maschoff Brennan

(57)          ABSTRACT

A system may include a controller coupled to a user interface. A user may provide user commands specifying mapping relationships between one or more audio inputs and one or more audio zones via the user interface. The controller may be configured to determine individual audio inputs to be outputted to individual audio zones based on a priority policy. The system may further include audio streaming applications coupled to the controller. The controller may launch the audio streaming applications to the user interface for interaction with the user. The audio streaming applications may provide audio streams to be outputted at the individual audio zones. The system may further include a streaming interface coupled to the controller and the audio streaming applications and configured to receive the audio streams. The streaming interface may be further configured to transmit the audio streams to output devices of the individual audio zones.

19 Claims, 5 Drawing Sheets

(56) References Cited

U.S. PATENT DOCUMENTS

| 2016/0353218 | A1 | 12/2016 | Starobin et al. | |
| 2021/0352427 | A1 | 11/2021 | Itakura et al. | |
| 2022/0038837 | A1* | 2/2022 | Del Sordo | H04R 5/04 |
| 2023/0004342 | A1* | 1/2023 | Trestain | H04R 3/04 |

* cited by examiner
† cited by third party

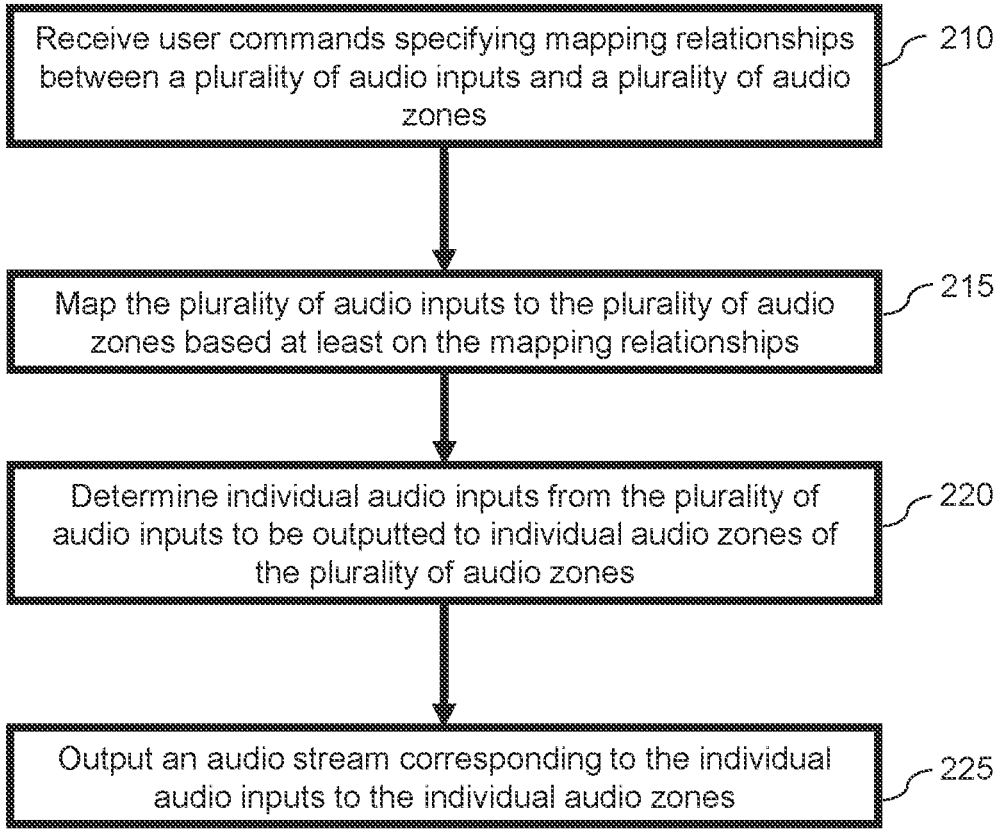

Receive user commands specifying mapping relationships between a plurality of audio inputs and a plurality of audio zones — 210

Map the plurality of audio inputs to the plurality of audio zones based at least on the mapping relationships — 215

Determine individual audio inputs from the plurality of audio inputs to be outputted to individual audio zones of the plurality of audio zones — 220

Output an audio stream corresponding to the individual audio inputs to the individual audio zones — 225

*FIG. 2*

DYNAMIC MAPPING OF AUDIO TO ZONES

CROSS-REFERENCE TO RELATED APPLICATION

This patent application claims the benefit of and priority to U.S. Provisional App. No. 63/412,414, titled "DYNAMIC MAPPING OF AUDIO TO ZONES," which is incorporated in the present disclosure by reference in its entirety.

FIELD

Embodiments of the present disclosure relate to a system and a method of mapping different audio inputs to different zones.

BACKGROUND

A property may include multiple zones or rooms with separate audio output devices such as speakers. An audio system may be used to output different audio inputs to the audio output devices. As multiple audio input sources attempt to output to the audio output devices, conflicts may arise as to which audio input is outputted to which audio output devices. As such, one or more algorithms may be used to determine individual audio inputs for each of the audio output devices.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes a controller coupled to a user interface. A user may provide user inputs specifying mapping relationships between one or more audio inputs and one or more audio zones via the user interface. The controller may be configured to determine individual audio inputs to be outputted to individual audio zones based on a priority policy. The system may further include audio streaming applications coupled to the controller. The controller may launch the audio streaming applications to the user interface for interaction with the user. The audio streaming applications may provide audio streams to be outputted at the individual audio zones. The system may further include a streaming interface coupled to the controller and the audio streaming applications and configured to receive the audio streams. The streaming interface may be further configured to transmit the audio streams to output devices of the individual audio zones.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which:

FIG. 2 illustrates an example flowchart of an example method of outputting an audio stream corresponding to an audio input to an audio zone;

DETAILED DESCRIPTION

A multi-zone audio system may be used to play various audio contents in different areas and/or zones of a property or a building simultaneously. The multi-zone audio system may permit a single audio content to play at multiple zones and/or permit multiple audio contents to play at multiple zones at a same time.

In some instances, multiple audio contents may attempt to play at a same zone. For instance, multiple users may attempt to play to the same zone. Some traditional approaches to such an instance may include only allowing one connection to exist relative to a single zone. For instance, when a user attempts to map and/or connect a particular audio input to a zone, an audio system may un-map or disconnect another audio input that was previously mapped or connected to the zone. The user may then map the particular audio input to the zone, until the particular audio input is again removed by a subsequent audio input.

Such an approach may cause users to repeatedly remap or reconnect audio inputs to the zones as previous connections may be removed by another connection. The repeated remapping may complicate user experience with the audio system. Further, such an approach may prevent users from customizing and/or organizing different connections. For instance, a user may desire to name different audio inputs based at least on how the different audio inputs are mapped, making it more convenient to play desired audio inputs to desired audio zones, which may not be viable when the audio inputs are repeatedly un-mapped.

Some embodiments in this disclosure may relate to a multi-zone audio system that may be configured to connect and/or map multiple audio inputs to multiple audio zones (in the present disclosure, a reference to a zone and an audio zone may be used to interchangeably). For instance, the multi-zone audio system may allow a single audio input to be mapped and/or connected to multiple audio zones at a time. Furthermore, the multi-zone audio system may allow multiple audio inputs to be mapped and/or connected to a single audio zone at a same time. The multi-zone audio system may be configured to determine which of the audio inputs are to take control of each of the multiple audio zones at a given moment. For example, the multi-zone audio system may determine individual audio inputs that are attempting to play audio contents to different audio zones. The multi-zone audio system may further assign priorities to the individual audio inputs relative to the different audio zones based at least on a priority policy. As a result, one or more mappings and/or connections established between the audio inputs and the audio zones may be preserved without being removed and/or overridden whenever a new mapping or a connection is made.

One or more example embodiments are explained with reference to the accompanying drawings.

Figure 1:
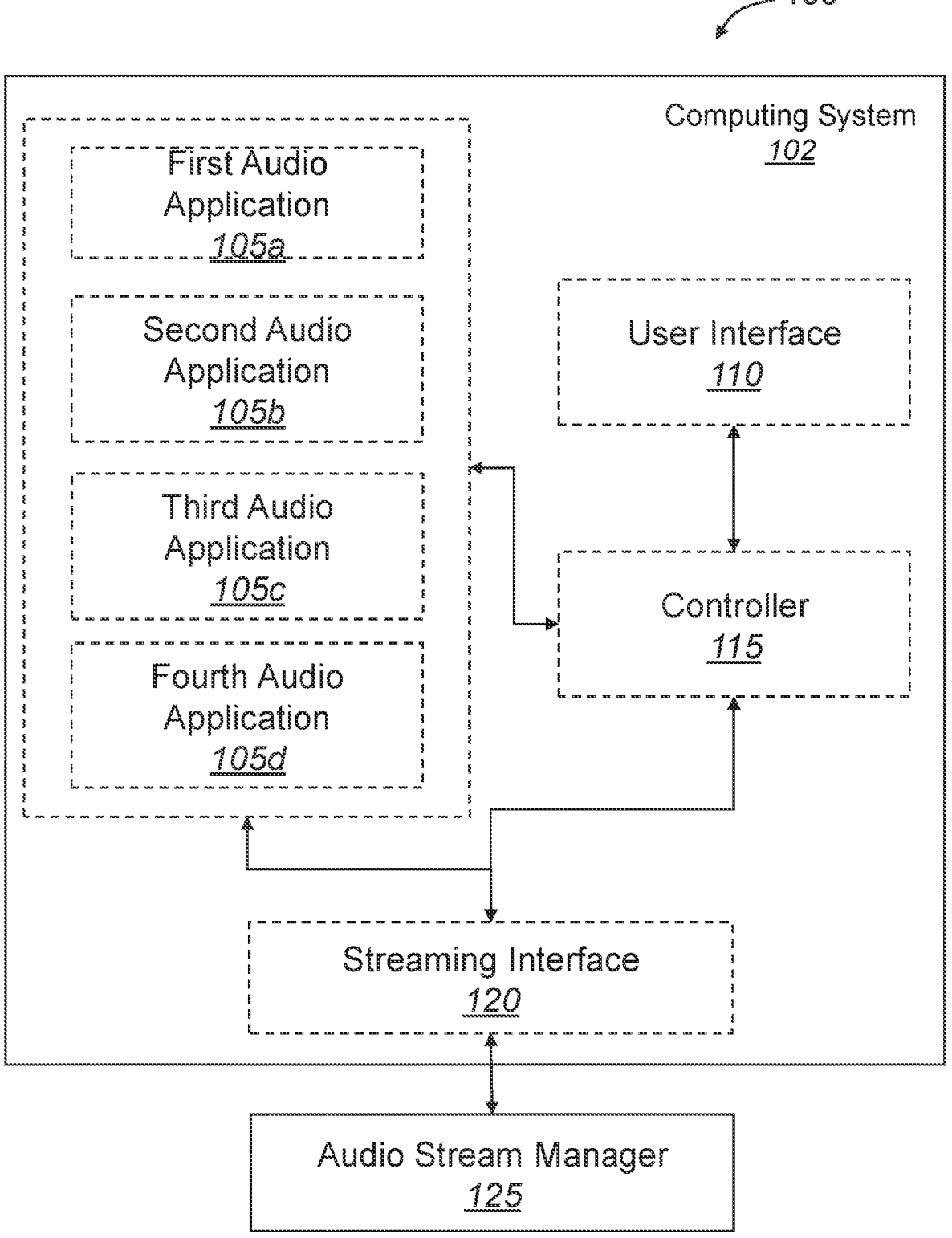
FIG. 1 is a block diagram illustrating an example multi-zone audio system.

FIG. 1 is a block diagram illustrating an example multi-zone audio system 100 in accordance with one or more embodiments of the present disclosure. In some embodiments, the multi-zone audio system ("audio system") 100 may include a computing system 102 and an audio stream manager 125. In some embodiments, the computing system 102 may be configured to perform one or more operations to determine and transmit audio contents and/or audio streams to the audio stream manager 125 to be played on one or more audio zones.

In some embodiments, the computing system 102 may include a controller 115 configured to handle one or more functions of the audio system 100. For example, the controller 115 may be configured to connect the audio system 100 to different networks, apply and store user configurations, handle communication between the audio system 100 and other audio systems on a same network, among others. Additionally, the controller 115 may be configured to perform one or more operations related to dynamic mapping features of the audio system 100.

In some embodiments, the controller 115 may be configured to map one or more audio inputs to one or more audio zones. In these and other embodiments, the one or more audio inputs may include different types of audio data sources and/or connections that the audio system 100 may establish to obtain the audio contents or the audio streams. In some embodiments, the audio system 100 may be establish connection with different types of audio inputs. For instance, the audio inputs may include wireless connections and/or physical connections.

In some embodiments, the audio inputs may include wireless inputs that may establish connections and/or deliver the audio streams to the audio system 100 via network connections. For instance, the network-based inputs may be connected to the audio system 100 via network connections such as a local area network (LAN), a wide area network (WAN), a metropolitan area network (MAN), a personal area network (PAN), a campus area network (CAN), a storage area network (SAN), a wireless local area network (WLAN), a cellular network, a satellite network, among others. In these and other embodiments, the audio data may be transmitted to the audio system as data packets corresponding to the audio data in a sequential order. Some examples of the network-based inputs may include Airplay, Spotify Connect, Google Cast, Amazon Alexa Cast, etc. Additionally or alternatively, the network-based inputs may include any other suitable services that may transmit data over a network connection such as RTSP, HTTP, and/or UDP protocols.

In some embodiments, the audio inputs may include wired and/or fiber optic inputs that may establish connection with the audio system 100 and deliver the audio streams to the audio system 100 via a physical connection. In these and other embodiments, the physical connections may include any suitable connector types that may be used to convert and/or transfer the audio data. For example, physical audio inputs may include RCA, S/PDIF, USB, among others.

In some embodiments, the controller 115 may be configured to launch one or more audio applications corresponding to the audio inputs. For instance, the audio applications may include applications that may be used to interact with and/or control different types of audio inputs. In some instances, the audio application may correspond to specific audio inputs. For example, in some embodiments, the controller 115 may be configured to launch a first audio application 105a, a second audio application 105b, a third audio application 105c, and a fourth audio application (collectively referred to as the audio applications 105). While FIG. 1 depicts four audio applications, the controller 115 may be configured launch any number of audio applications suitable for the audio system 100. For instance, the controller may launch less or more than four audio applications 105.

In some embodiments, the first audio application 105a may correspond to a certain type of network-based input. For example, the first audio application 105a may correspond to the Airplay. In these instances, the first audio application 105a may allow a user to interact with the Airplay. For example, the user may use the first audio application 105a to choose specific audio data, and/or configure various audio settings.

Additionally or alternatively, the second audio application 105b, the third audio application 105c, and the fourth audio application 105d may each correspond to different audio inputs. For example, the second audio application 105b may correspond to Spotify Connect. The third audio application 105c may correspond to the RCA connection, and the fourth audio application 105d may correspond to the USB connection.

In some embodiments, the audio zones may include different areas or zones within a property. For example, the audio zones may include different rooms within a building or a house. In these and other embodiments, the audio zones may each include one or more devices that may be used to output the audio data obtained through the one or more audio inputs. For example, the audio zones may include speakers.

In some embodiments, the controller 115 may be configured to map the one or more audio inputs to the one or more audio zones. In these and other embodiments, the audio inputs may be mapped to the audio zones when a correlation and/or an association is made between the audio inputs and the audio zones. By mapping a particular audio input to a particular audio zone, the particular audio input may establish the association with the particular audio zone to be able to transmit and output the audio streams to the particular audio zone.

In some embodiments, the controller 115 may map the audio inputs to the audio zones based at least on user commands. In these and other embodiments, the user commands may specify mapping relationships between the audio inputs and the audio zones. For instance, the user commands may specify which individual audio zones are to be associated with different individual audio inputs. In some embodiments, the controller 115 may obtain the user commands via a user interface 110 communicatively coupled to the controller 115. For instance, the user interface 110 may permit users to interact with the audio system 100 by causing the controller 115 to perform one or more functions such as mapping the audio inputs to the audio zones. In some embodiments, the user interface 110 may include any software and/or a hardware that many allow thee users to input commands to the controller 115. For example, the user interface 110 may include a web server. For instance, the web server may be used to render web pages for the users and may host a REST API at a standard IP port 80 for HTTP communication or 443 for HTTPS communication using self-signed certificates. In these and other embodiments, the user interface 110 (e.g., the web server) may communicate with the controller 115 using interposes communication (IPC) methods such as a local TCP socket, or a UNIX named pipe. In some embodiments, the web server may be provided to the users via different types of devices such as smartphones, tablets, smart devices, computers, laptops, among others.

In some embodiments, the controller 115 may map multiple individual audio inputs to a single individual audio zone. For instance, different types of audio inputs may all get mapped to the single individual audio zone. For example, the audio inputs such as the Airplay, the Spotify Connect, the RCA, and the USB may be mapped to the single individual audio zone such as a particular room in a house (e.g., kitchen).

In some embodiments, the multiple individual audio inputs mapped to same audio zone may include the audio inputs from different users. For instance, a first user may map a first audio input such as the Airplay to a specific audio zone. Additionally, a second user may map a second audio input such as the Spotify Connect to the specific audio zone.

In some embodiments, an individual audio input may be mapped to multiple audio zones. For instance, the first user may map the first audio input (e.g., the Airplay) to the multiple audio zones (e.g., kitchen, living room, bedroom, etc.). In these and other embodiments, the first audio input may be used to play and/or output same audio data to the multiple audio zones simultaneously.

In some embodiments, the controller 115 may be configured to determine which of the individual audio inputs mapped to the individual audio zones should be active (e.g., audible) in the individual audio zones. In some embodiments, the controller 115 may be configured to determine which of the individual audio inputs should be active based at least on a priority policy. In these and other embodiments, the priority policy may specify one or more parameters to determine which audio input is active in the audio zones. In some embodiments, the priority policy may be predetermined by the audio system 100. For example, the controller 115 may include one or more standard priority policies that may be followed.

For example, in some embodiments, the priority policy may include a first-come-first serve (FCFS) policy. In these and other embodiments, the FCFS policy may include determining a first audio input that is both mapped and streaming to an audio zone. For instance, the controller 115 may be configured to keep track of when the audio inputs become mapped to the audio zones and when the audio inputs begin streaming (e.g., transmitting the audio streams). In some embodiments, an audio input may be mapped to an audio zone in response to the controller 115 receiving such instructions from the user interface 110. In some embodiments, the FCFS policy may be implemented based only when the audio inputs begin streaming. For instance, the controller 115 may be configured to determine the first audio input that started streaming.

In some embodiments, the audio input may be considered as streaming when the audio streams are received from corresponding audio applications 105. For instance, a streaming interface 120 may be configured to detect when the audio streams are received from particular audio applications 105. The streaming interface 120 may be further configured to relay such detection information to the controller 115.

Additionally or alternatively, the audio input may be considered as streaming in response to detecting a valid audio signal from the audio inputs. For instance, the streaming interface 120 may be configured to monitor the audio inputs to detect valid audio signals. For example, some types of audio inputs, such as physical RCA inputs, may produce noise signals even when the audio inputs are not actively streaming. The streaming interface 120 may be configured to determine whether signals from the audio inputs include valid audio signals over the noise signals. In some embodiments, the streaming interface 120 may be configured to calculate an absolute moving average of each audio input's audio sample and compare with an audio threshold level. In these and other embodiments, the threshold may be determined by the users or the audio system 100. In some embodiments, in response to an audio input satisfying and/or exceeding the audio threshold level, the audio input may be considered as streaming. In some embodiments, any other suitable algorithms may be used. For example, a moving root mean squared (RMS) or a more complex method involving use of Fast Fourier Transforms to detect presence of instruments and/or vocals may be used.

For an example of the FCFS policy, user A may begin streaming at an audio input A before user B begins streaming at an audio input B. Further, user A may desire to map the audio input A to an audio zone 1. However, user B and/or the audio input B may be already mapped to the audio zone 1. In this instance, because user B was mapped to the audio zone 1 and began streaming at the audio input B before the user A or the audio input A was mapped to the audio zone 1, the audio input B would be active in the audio zone 1. Accordingly, the user A may not override the user B.

As another example, the user A may have mapped the audio input A to an audio zone 2 followed by the user B mapping the audio input B to the audio zone 2. The user B then may stream at the audio input B, followed by the user A streaming at the audio input A. In this instance, although the user A mapped the audio input A to the audio zone 2 before the user B, the audio input B may be active in the audio zone 2 because user B completed mapping the audio input B to the audio zone 2 and streaming at the audio input B first.

In these and other embodiments, the controller 115 may be configured to generate and store a first set of timestamps corresponding to times the individual audio inputs are mapped to the individual audio zones and a second set of timestamps corresponding to times the individual audio inputs begin streaming. For instance, the controller 115 may store the first set of timestamps and the second set of timestamps in a chronological order for each of the individual audio zones. In these and other embodiments, the first set of timestamps and the second set of timestamps may be used to determine which audio input satisfies the priority policy.

In some embodiments, the priority policy may be a last-come-first serve (LCFS) policy. In these and other embodiments, the LCFS policy may be implemented in a similar manner as the FCFS policy. For instance, the controller 115 may be configured to determine the first set of timestamps and the second set of timestamps based on when the audio inputs are mapped to the audio zones and when the audio inputs are streaming as done with respect to the FCFS policy. Then, the controller may determine and/or select the audio input that completed both mapping and streaming latest. In some embodiments, the LCFS policy may be implemented based only when the audio inputs begin streaming. For instance, the controller 115 may be configured to determine a last audio input that started streaming.

In some embodiments, the priority policy may be based at least on the different types of the audio inputs. For instance, a certain audio zone may have a preferred types of audio inputs. In some embodiments, the preferred types may be based at least on average connection strength. For example, in some instances, the physical audio inputs may be preferred more than the network-based audio inputs for connection stability. In other embodiments, the users may provide the preferred types of audio inputs. For example, for a specific audio zone, such as a kitchen, the users may prefer (e.g., place a higher priority on) specific audio inputs (e.g., Airplay).

In these and other embodiments, each type of audio input may be assigned a preference level. In some instances, the preference level may be represented using a numeric value and/or a text string. For example, the audio inputs with the highest priority may be assigned as "1" and the number may increase therefrom to lower preference levels. In these and other embodiments, in response to detecting multiple audio inputs trying to stream audio data on the specific audio zone, the controller 115 may select a specific audio input with the highest preference level to be played on the specific audio zone.

In some instances, multiple audio inputs with same preference level may be attempting to play to the specific audio zone. In these instances, the controller 115 may apply other priority policies among the multiple audio inputs with the same preference level. For instance, the FCFS policy or the LCFS policy may be applied among the multiple audio inputs.

In some embodiments, the controller 115 may permit the users to override and/or bypass the priority policy to output a selected audio input to the specific audio zone. For example, a particular audio system may implement the FCFS policy to determine which audio inputs are played on which audio zones. In some instance, a user may desire to override an active audio input that is already be playing to the specific audio zone to play the selected audio input.

In some embodiments, the priority policy may be overridden simply by changing the timestamps associated with the selected audio input to be earlier than other timestamps or events. For instance, the timestamps representing when the selected audio input was mapped to the specific audio zone and when the selected audio input began streaming may be modified to be earlier than all other timestamps associated with the specific audio zone. However, such an approach may affect other audio zones other than the specific audio zone, as the timestamp representing when the selected audio input began streaming may affect priority decisions in other audio zones.

In some embodiments, to reduce chances of affecting other audio zones, only the timestamp representing when the selected audio zone was mapped to the specific audio zone may be modified to be earlier than other timestamps or events. However, such an approach may not always effectively override the priority policy. For example, the selected audio input may still not be prioritized over other audio inputs if the selected audio input began streaming after one or more other audio inputs were mapped and streaming prior to the selected audio input starting to stream.

To minimize the chances of affecting other audio zones while still effectively overcoming the priority policy for the particular audio zone, the timestamps associated with the selected audio input may be modified according to specific rules. For instance, the timestamp representing when the selected audio input was mapped to the specific audio zone may be modified be immediately before a timestamp representing a first streaming instance associated with the specific audio zone. Additionally, other timestamps representing when the other audio inputs were mapped to the specific audio zone may be modified to be immediately after the timestamp representing when the selected audio input began streaming. In these instances, a relative chronological order of the other timestamps may be preserved.

For example, in an instance involving the audio input A, the audio input B, and an audio input C, the audio input A may be mapped at timestamp $A_m$, and the audio input A may begin streaming at timestamp $A_s$. The audio input B may be mapped at timestamp $B_m$, and the audio input B may begin streaming at timestamp $B_s$. The audio input C may be mapped at timestamp $C_m$, and the audio input C may begin streaming at timestamp $C_s$. In an example, the timestamps may be aligned (according to when the events happened) as $A_m A_s B_m B_s C_m C_s$. To force the audio input B to be active in the specific audio zone, the timestamp $B_m$ may be modified to be before the timestamp representing first streaming instance (e.g., $A_s$). For example, the timestamps may be aligned as $A_m B_m A_s B_s C_m C_s$. Additionally, the timestamps representing when the other audio inputs were mapped to the specific audio zone (e.g., $A_m$ and $C_m$) may be modified to be immediately after $B_s$, while preserving the order between $A_m$ and $C_m$. For example, the timestamps may be aligned as $B_m A_s B_s A_m C_m C_s$. In these instances, original priorities between the audio input A, the audio input B, and the audio input C, A-B-C, may be effectively modified to B-A-C.

In some embodiments where the priority policy involves the LCFS policy, modification and/or overriding process may be similar to the FCFS policy with a few differences. In these instances, the timestamp representing when the selected audio input was mapped to the specific audio zone may be modified to be immediately after the timestamp representing last streaming instance. Additionally, the timestamps representing when the other audio inputs began streaming after the selected audio input may be modified to be immediately before the timestamp representing when the selected audio input began streaming.

In some embodiments where the priority policy is based on the preference levels assigned to the audio inputs, the modification and/or the overriding process may include assigning a temporary preference level to the selected audio input that may allow the selected audio input to be active in the specific audio zone. For example, events and/or timestamps of the selected audio input may be added to a list of the timestamps corresponding to the highest preference level. In some embodiments, the events and/or the timestamps representing the selected audio input's original preference level may not be removed. In some instances where the selected audio input is made active is unmapped and/or stops streaming, the events or the timestamps corresponding to the selected audio input in both the original preference level and the modified preference level may be removed.

In some instances where the modified preference level and the original preference level are the same (e.g., only the timestamps within the same preference level are modified), the timestamps corresponding to the selected audio input in both the original preference level and modified preference level are removed as there should only be one input overriding the other audio inputs.

Modifications, additions, or omissions may be made to the system 100 without departing from the scope of the disclosure. For example, the designations of different elements in the manner described is meant to help explain concepts described herein and is not limiting. As another example, the system 100 may include any number of other elements or may be implemented within other systems or contexts than those described. For example, the system 100 may include any number audio applications 105.

FIG. 2 illustrate a flowchart of an example method 200 of outputting an audio stream corresponding to an audio input to an audio zone, in accordance with one or more embodiments of the present disclosure. In these and other embodiments, one or more of the steps or none of the steps of the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 210, where user commands specifying mapping relationships between one or more audio inputs and one or more audio zones are received. For instance, the user commands may be received by a controller via a user interface.

At block 215, the one or more audio inputs may be mapped to the one or more audio zones based at least on the mapping relationships. For example, the controller may establish a connection and/or a mapping relationship between the one or more audio inputs and the one or more audio zones according to the user commands.

At block 220, individual audio inputs from the one or more audio inputs to be outputted to individual audio zones of the one or more audio zones may be determined. In some embodiments, the individual audio inputs may be determined based at least on a first set of timestamps and a second set of timestamps. For instance, the first set of timestamps may represent when the individual audio inputs were mapped to the individual audio zones. In these and other embodiments, it may be determined which of the individual audio inputs mapped to the individual audio zones are streaming. For instance, the individual audio inputs may be streaming if the individual audio inputs are generating and/or transmitting audio stream at the individual audio inputs. In some embodiments, the second set of timestamps may represent when the individual audio inputs began streaming.

In some embodiments, the individual audio inputs may be prioritized based at least on the first set of timestamps and the second set of timestamps. For instance, the individual audio inputs with highest priority may be determined as the individual audio inputs to be played at the individual audio zones. In some embodiments, the prioritizing the individual audio inputs may include aligning the first set of timestamps and the second set of timestamps in a chronological order, and determining a first individual audio input that was mapped and streaming first in the individual audio zones. For instance, a priority policy being implemented may include a first-come-first serve (FCFS) policy. In some embodiments, the priority policy may include a last-come-first serve (LCFS) policy where a last individual audio input that was mapped and streaming in the individual audio zones may be prioritized.

In some embodiments, the individual audio inputs may be prioritized based on types of the individual audio inputs. For instance, different types of the individual audio inputs may be determined. For example, the different types may include network-based audio inputs, physical inputs, among others. In these and other embodiments, the individual audio inputs with predetermined types may be prioritized. For example, the individual audio inputs that include physical connections may be prioritized over other audio inputs connected via networks. As another example, the individual audio inputs with a one-on-one connection to the individual audio zones may be prioritized over other audio inputs that are mapped to multiple audio zones. In some embodiments, the predetermined types may be selected by the user. In other embodiments, the audio system may determine the predetermined types.

At block 225, an audio stream corresponding to the individual audio inputs may be outputted to the individual audio zones. In some embodiments, the individual audio inputs satisfying the priority policy for the individual audio zones may become active in the individual audio zones. For instance, the individual audio inputs may be active when the audio stream being streamed at the individual audio inputs are actually streamed and/or become audible at the individual audio zones.

In some embodiments, the audio stream configured to be played at the individual audio zones may be obtained from one or more audio stream applications. For instance, the audio stream applications may allow the users to interact with the individual audio inputs to determine which audio streams are streamed on the individual audio inputs and/or to modify different settings, such as audio modification, volume, playback speed, etc.

Modifications, additions, or omissions may be made to the method 200 without departing from the scope of the disclosure. For example, the operations of the method 200 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

For example, the method 200 may further include storing priorities of the individual audio inputs mapped to the individual audio zones in a memory. For instance, for each individual audio zone, a list including the individual audio inputs and respective priorities may be stored in the memory. In some embodiments, when an individual audio input with the highest priority is no longer active (e.g., un-mapped and/or not streaming anymore), the individual audio input with the next highest priority may become active in the individual audio zones based on the list stored in the memory.

Figure 3:
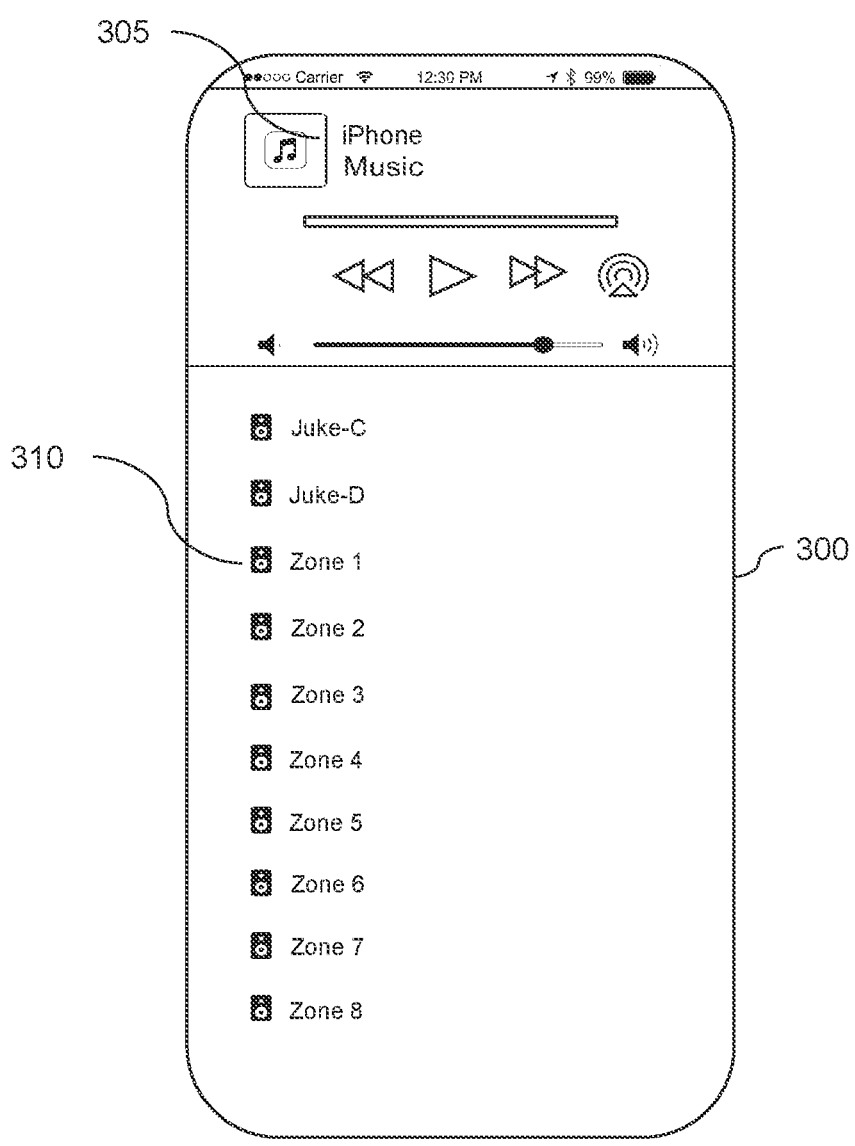
FIGS. 3-4 illustrate various user interfaces which may be used in association with the system and methods described herein.

FIG. 3 illustrates an example user interface 300, in accordance with one or more embodiments of the present disclosure. For example, the user interface 300 may display one or more audio zones 310 that a particular audio input 305 may be mapped to. In some embodiments, the particular audio input 305 may be mapped to multiple audio zones 310 without a particular mapping overriding another mapping. In some embodiments, a user interacting with the user interface may rename the audio zones 310 based on how the audio zones 310 are mapped. For instance, the user may rename the audio zones 310 to reflect specific locations (e.g., kitchen, living room, office, etc.) of the audio zones 310.

In some embodiments, the user may interact with the user interface 300 to override other audio inputs mapped and/or streaming to the audio zones 310. For instance, the user may command a controller (such as the controller 115 of FIG. 1) to override other audio inputs with the particular audio input 305.

Modifications, additions, or omissions may be made to the method 300 without departing from the scope of the disclosure. For example, the designations of different elements in the manner described is meant to help explain concepts described herein and is not limiting.

Figure 4:
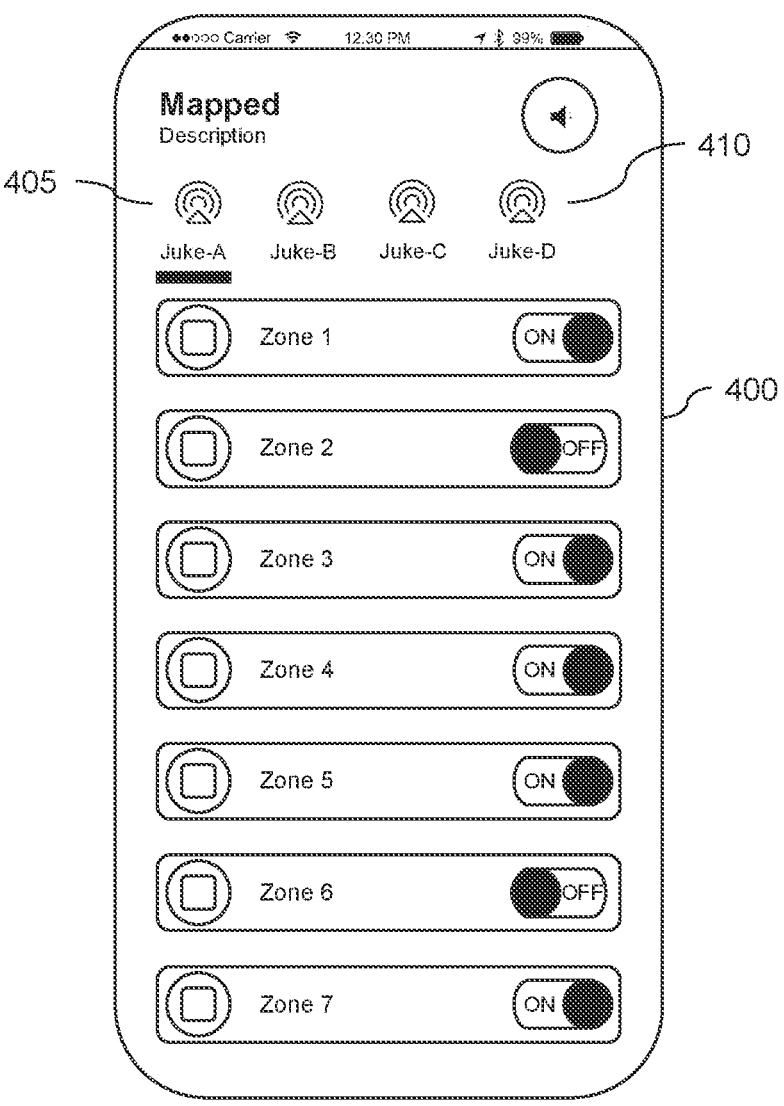

FIG. 4 illustrates an example user interface 400, in accordance with one or more embodiments of the present disclosure. The user interface 400 may illustrate how a user may map and/or assign audio inputs to audio zones. In some embodiments, a first audio input 405 may be mapped to multiple audio zones 407. For instance, the first audio input 405 may be mapped to Zone 1-Zone 7, as illustrated in FIG. 4. In some embodiments, the user may manage mapping relationships of the first audio input 405 via the user interface 400. For instance, the user may turn on and off particular audio zones. In some embodiments, turning off a specific audio zone may represent un-mapping the first audio input 405 from the specific audio zone. The user may remap the first audio input 405 to the specific audio zone by turning on the specific audio zone.

In these and other embodiments, in response to the first audio input 405 beginning to stream corresponding audio data, the controller may attempt to output the corresponding audio data to each of the audio zones that are turned on.

In some embodiments, an audio input may be mapped and/or tightly coupled to a single audio zone. For instance, a second audio input 410 may be coupled to the single audio zone. In these instances, the second audio input 410 may not be mapped to other audio zones. In these instances, the user may associate the second audio input 410 directly with the single audio zone. In some instances, a name of the second audio input 410 may be changed to match a name of the single audio zone. For example, the second audio input 410 may include a wireless audio input such as Airplay and the single audio zone may be named as Zone 1. In these instances, the name of the second audio input 410 (e.g., the Airplay) on the user interface may be changed to Zone 1, which may allow the user to conveniently locate and output audio data to Zone 1.

Figure 5:
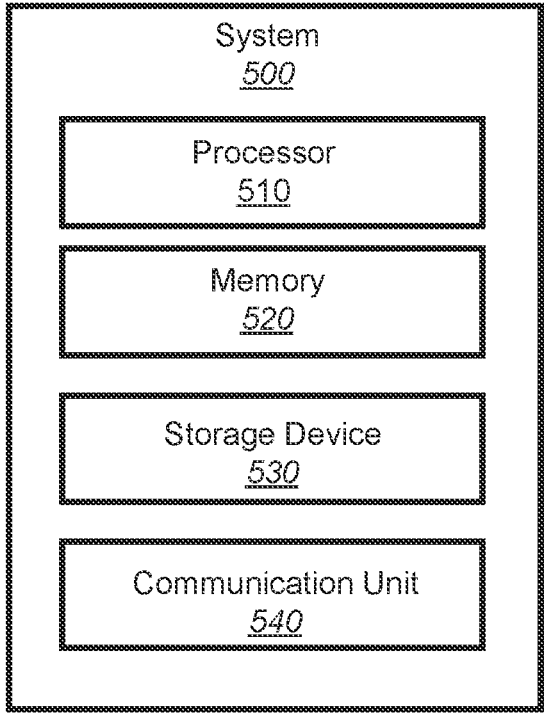
FIG. 5 illustrates an example computing system, in accordance with one or more embodiments of the present disclosure.

FIG. 5 illustrates an example computing system 500, according to at least one embodiment described in the present disclosure. The computing system 500 may include a processor 510, a memory 520, a storage device 530, and/or a communication unit 540, which all may be communicatively coupled. Any or all of the audio system 100 of FIG. 1 may be implemented as a computing system consistent with the computing system 500, such as the computing system 102 of FIG. 1.

Generally, the processor 510 may include any computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520. In some embodiments, the processor 510 may load the program instructions into the memory 520.

After the program instructions are loaded into the memory 520, the processor 510 may execute the program instructions, such as instructions to perform the method 200 of FIG. 2, respectively. For example, the processor 510 may obtain instructions regarding facilitating a transaction between users, verifying ownership of a token, posting information to a blockchain, etc.

The memory 520 and the storage device 530 may include computer-readable storage media or one or more computer-readable storage mediums for carrying or having computer-executable instructions or data structures stored thereon.

Such computer-readable storage media may be any available media that may be accessed by a computer, such as the processor 510. For example, the memory 520 and/or the storage device 530 may store mapping relationship between audio inputs and audio zones. In some embodiments, the computing system 500 may or may not include either of the memory 520 and/or the storage device 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system comprising:
a controller configured to obtain user commands via a user interface over a network, the user commands specifying mapping relationships between a plurality of audio inputs and a plurality of audio zones, one or more individual audio inputs of the plurality of audio inputs being mapped to one or more individual audio zones of the plurality of audio zones based on the user commands, wherein the one or more individual audio zones are configured to output an active audio input selected from the one or more individual audio inputs mapped to the one or more individual audio zones, the active audio input being selected over other mapped audio inputs based on a priority policy, wherein the priority policy is defined to prioritize the individual audio inputs based on individual times corresponding to the individual audio inputs becoming both mapped to the individual audio zones and begin streaming;
one or more audio streaming applications communicatively coupled to the controller, the audio streaming applications being launched by the controller, wherein the one or more audio streaming applications are configured to provide audio streams to the audio inputs from an audio data source; and
a streaming interface communicatively coupled to the controller and configured to receive the audio streams from the one or more audio streaming applications, the streaming interface further configured to transmit the audio streams to one or more output devices of the individual audio zones.

2. The system of claim 1, wherein the active audio input represents a particular audio input being played on the individual audio zones, the active audio input selected from the one or more individual audio inputs that are mapped to the individual audio zones and are streaming, the controller further configured to store one or more timestamps corresponding to the individual audio zones, the timestamps representing when the individual audio inputs became mapped to the individual audio zones and when the individual audio inputs began streaming.

3. The system of claim 2, wherein the timestamps are modified to permit particular individual audio inputs to be prioritized in particular audio zones.

4. The system of claim 1, wherein the priority policy is overridden by the user to play the individual audio inputs of choice to the individual audio zones.

5. The system of claim 1, wherein the plurality of audio zones includes different zones, rooms, or areas within a property.

6. The system of claim 1, wherein the output devices include one or more of speakers placed within the plurality of audio zones.

7. The system of claim 1, wherein the audio data source is a remote audio data source, the one or more audio streaming applications being configured to obtain the audio streams from the audio data source via a wireless connection.

8. The system of claim 1, wherein the audio data source is a physical audio data source connected to the system via analog connections.

9. The system of claim 1, wherein the priority policy is based on a type of the audio inputs.

10. The system of claim 1, wherein the controller is configured to store a list of the plurality of audio inputs mapped to each of the plurality of audio zones.

11. The system of claim 10, wherein in response to a prioritized individual audio input of a particular audio zone becoming inactive, next individual audio input that is active in the particular audio zone is outputted to the particular audio zone.

12. The system of claim 1, wherein the priority policy is based on when the individual audio inputs begin streaming.

13. The system of claim 12, wherein the individual audio inputs are considered streaming when audio signals from the individual audio inputs exceed an audio threshold level.

14. A method comprising:
  receiving user commands specifying mapping relationships between a plurality of audio inputs and a plurality of audio zones;
  mapping the plurality of audio inputs to the plurality of audio zones based at least on the mapping relationships;
  determining individual audio inputs from the plurality of audio inputs to be outputted to individual audio zones of the plurality of audio zones based at least on a priority policy, wherein the priority policy is defined to prioritize the individual audio inputs based on individual times corresponding to the individual audio inputs becoming both mapped to the individual audio zones and begin streaming; and
  outputting an audio stream corresponding to the individual audio inputs to the individual audio zones.

15. The method of claim 14, wherein the determining the individual audio inputs from the plurality of audio inputs comprises:
  determining a first set of timestamps representing when the individual audio inputs were mapped to the individual audio zones;
  determining which of the individual audio inputs mapped to the individual audio zones are streaming;
  determining a second set of timestamps representing when the individual audio inputs began streaming; and
  prioritizing the individual audio inputs based at least on the first set of timestamps and the second set of timestamps.

16. The method of claim 15, wherein the prioritizing the individual audio inputs comprises:
  aligning the first set of timestamps and the second set of timestamps in a chronological order; and
  determining a first individual audio input that was mapped and streaming first in the individual audio zones.

17. The method of claim 14, wherein the determining the individual audio inputs from the plurality of audio inputs further comprises:
  determining when the individual audio inputs began streaming; and
  prioritizing the individual audio inputs based on when the individual audio inputs began streaming.

18. The method of claim 14, wherein the determining the individual audio inputs from the plurality of audio inputs comprises:
  determining types of the individual audio inputs; and
  prioritizing the individual audio inputs with predetermined types, wherein the predetermined types are selected by a user.

19. The method of claim 14, further comprising:
  assigning priorities to the individual audio inputs based on a priority policy, with respect to the individual audio zones, wherein the priorities for the individual audio zones are stored in a memory.

* * * * *